(12) United States Patent
Sliwa, Jr. et al.

(10) Patent No.: US 7,600,410 B2
(45) Date of Patent: Oct. 13, 2009

(54) OPTICAL TECHNIQUES AND SYSTEM FOR 3-D CHARACTERIZATION OF ULTRASOUND BEAMS

(75) Inventors: John W. Sliwa, Jr., Los Altos, CA (US); Prasanna Hariharan, Rockville, MD (US); Ronald A. Robinson, Germantown, MD (US); Matthew R. Myers, Potomac, MD (US); Subha Maruvada, North Bethesda, MD (US); Rupak K. Banerjee, Mason, OH (US); Gerald R. Harris, Rockville, MD (US)

(73) Assignees: St. Jude Medical, Atrial Fibrillation Division, Inc., St. Paul, MN (US); The United States of America as represented by the Secretary Department of Health and Human Services, Washington, DC (US); The University of Cincinnati, Cincinnati, OH (US)

(*) Notice: Subject to any disclaimer, the term of this patent is extended or adjusted under 35 U.S.C. 154(b) by 473 days.

(21) Appl. No.: 11/642,989

(22) Filed: Dec. 21, 2006

(65) Prior Publication Data
US 2007/0204671 A1    Sep. 6, 2007

Related U.S. Application Data

(60) Provisional application No. 60/752,630, filed on Dec. 21, 2005.

(51) Int. Cl.
*G01V 13/00*    (2006.01)
(52) U.S. Cl. ........................................... 73/1.83
(58) Field of Classification Search ................. None
See application file for complete search history.

(56) References Cited

U.S. PATENT DOCUMENTS

| | | | | |
|---|---|---|---|---|
| 4,331,021 A | * | 5/1982 | Lopez et al. | 73/1.86 |
| 4,625,542 A | * | 12/1986 | Nelson | 73/1.83 |
| 5,379,270 A | * | 1/1995 | Connolly | 367/128 |
| 6,004,269 A | | 12/1999 | Crowley et al. | |
| 6,023,638 A | | 2/2000 | Swanson | |
| 6,212,426 B1 | | 4/2001 | Swanson | |

(Continued)

OTHER PUBLICATIONS

Lourenco & Krothapalli, True Resolution PIV: A Mesh-free Second Order Accurate Algorithm, Proceedings of the Int'l Conf. in Appl. of Lasers to Fluid Mechanics, Lisbon, Portugal, Jul. 2000.

(Continued)

*Primary Examiner*—Robert R Raevis
(74) *Attorney, Agent, or Firm*—Wiley Rein LLP (57) ABSTRACT

A system for optically characterizing an acoustic beam generally includes an immersant, which is an immersion medium seeded with a plurality of seed particles that respond to illumination with fluorescence indicative of at least one parameter of the immersant such as flow or temperature. Optical transmitters illuminate the immersant slicewise, and optical receptors receive the fluorescence in order to generate a three-dimensional map of the parameter over time. A processor back-calculates one or more characteristics of an acoustic beam that results in the map. The processor initially generates a behavior model of an acoustic beam propagating in the immersant by utilizing initial guesses for the characteristics. The initial guess model is compared to the map, and an optimization routine is used to refine the initial guesses. The process repeats iteratively with refined guesses until the difference between the model and the map is minimized.

52 Claims, 4 Drawing Sheets

U.S. PATENT DOCUMENTS

| | | |
|---|---|---|
| 6,635,054 B2 | 10/2003 | Fjield et al. |
| 6,689,128 B2 | 2/2004 | Sliwa, Jr. et al. |
| 6,701,931 B2 | 3/2004 | Sliwa, Jr. et al. |
| 6,858,026 B2 | 2/2005 | Sliwa, Jr. et al. |
| 2007/0175280 A1* | 8/2007 | Johansen .................... 73/599 |

OTHER PUBLICATIONS

Robinson & Ilev, Design and optimization of a flexible high-peak-power laser-to-fiber coupled illumination system used in digital particle image velocimetry, Rev. Sci. Instrum., vol. 75, No. 11, 4856-62 (2004).

* cited by examiner

OPTICAL TECHNIQUES AND SYSTEM FOR 3-D CHARACTERIZATION OF ULTRASOUND BEAMS

CROSS-REFERENCE TO RELATED APPLICATIONS

This application claims the benefit of U.S. provisional application No. 60/752,630, filed 21 Dec. 2005, which is hereby incorporated by reference as though fully set forth herein.

BACKGROUND OF THE INVENTION a. Field of the Invention

The present invention is directed to optical techniques for non-invasively performing three-dimensional characterization of ultrasound beams. In particular, the present invention is directed to optical techniques for characterizing high power acoustic beams and fields, including with respect to their non-linearities.

b. Background Art

High power acoustic fields, such as are employed in the practice of medical High Intensity Focused Ultrasound (HIFU) therapy or surgery, are very difficult to measure, as their extreme intensities damage measurement instrumentation. Furthermore, propagation nonlinearities are frequently present, if not dominating.

Thus, existing HIFU transducers are typically tested in a low peak power, and thereby linear, regime (typically from about 1 W to about 3 W, or, in terms of power density, from about 0.01 W/cm$^2$ to about 100 W/cm$^2$) in order to avoid destruction of the measurement apparatus. Manufacturers and developers infer high power behavior (typically, between about 100 W and about 200 W, or, in terms of power density, between about 1500 W/cm$^2$ and about 3000 W/cm$^2$) from the low power test results.

This testing methodology is far from optimal, however, as some of the effect of HIFU is attributable to naturally occurring non-linear high-power phenomena. Consequently, the field of HIFU devices finds itself in the position of lacking metrics related to non-linear operational phenomena.

BRIEF SUMMARY OF THE INVENTION

It is therefore desirable to be able to non-invasively and non-destructively characterize acoustic beams at high power.

It is further desirable to be able to model the behavior of high intensity focused ultrasound beams in three dimensions in real-time or near real-time.

According to a first embodiment of the invention, a system for optically and non-invasively characterizing an acoustic beam includes: a container having an immersant disposed therein, the immersant including an immersion medium seeded with a plurality of seed particles; at least one optical transmitter that illuminates at least some of the plurality of seed particles; at least one optical receptor to track at least one optically-detectable parameter of at least some of the illuminated seed particles, thereby generating at least one immersant parameter map, and a processor that determines one or more characteristics of the acoustic beam from the at least one immersant parameter map and one or more known properties of the immersant. Typically, an acoustic source is coupled to the immersant to sonicate at least some of the immersed seed particles. Optionally, the immersion medium may be seeded only within a beam envelope region of the acoustic source. In some embodiments of the invention, the immersion medium is water based and the seed particles are substantially acoustically invisible, though it is contemplated that the seed particles may be selected to provide the immersant with tissue-like attenuation characteristics. It is also contemplated that the immersant may include an additive, such as gel, milk, cream, glycerin, mineral oil, or any combinations thereof, to provide the immersant with acoustic attenuation and thermal characteristics that more closely approximate those of tissue or other bodily materials. Advantageously, in addition to being at least partially transparent to the optical transmitter and optical receptor, the immersant may also be visually transparent to a human.

The immersant may be acoustically-streamable (i.e., flowable under acoustic radiation pressure and temperature), and the at least one optical receptor may track displacement of at least some illuminated seed particles to generate an immersant flow map from which the processor can determine the characteristics of the acoustic beam. Alternatively, the at least one optical receptor may track temperature of at least some illuminated seed particles to generate an immersant temperature map from which the processor can determine the characteristics of the acoustic beam. Thus, the seed particles may exhibit an optical behavior when illuminated that is a function of seed particle temperature, and preferably a monotonic function of seed particle temperature. Where only temperature is tracked, the immersant may be substantially stagnant (that is, non-streaming and non-flowing). Optionally, both displacement and temperature may be tracked in a flowable immersant.

The at least one optical transmitter may illuminate at least some seed particles in a slicewise two-dimensional, or linewise one-dimensional, manner, and may further pulse illuminate the seed particles. The at least one optical transmitter may be a solid state laser device, optionally including beam shaping optics. The at least one optical receptor may be positioned orthogonally to a direction in which the streamable immersant may flow, and may be a digital camera or an optical temperature measurement device, such as an infrared or ultraviolet thermographic temperature measurement device. Both the optical transmitter and the optical receptor may be incorporated in a single optical device. Any thermographic temperature signal returning from illuminated seed particles is preferably selected to pass through the immersant such that it can be optically detected by the at least one optical receptor outside the immersant volume. For example, fluorescent seed particles emit wavelengths, such as ultraviolet wavelengths, that can pass through many types of materials with minimal loss.

In another embodiment of the invention, a system for optically and non-invasively characterizing an acoustic beam in three dimensions includes: an immersant comprising a liquid-based immersion medium mixed with a plurality of seed particles, wherein the seed particles respond to illumination with fluorescence indicative of at least one parameter of the immersant; at least one optical transmitter to illuminate at least one slice or line of the immersant; at least one optical receptor to receive fluorescence from seed particles within one or more illuminated slices or lines, and a processor to generate a three-dimensional map of at least one immersant parameter from fluorescence received by the at least one optical receptor. The system may further include a processor to analyze the three-dimensional map and determine therefrom one or more characteristics of the acoustic beam. The slices may be substantially parallel or substantially coaxial, and are preferably oriented substantially parallel to a direction in which the immersant may flow. Typically, the at least one optical receptor will be oriented substantially orthogonally to the illuminated slices such that it can detect optical signals (e.g., seed particle fluorescence) across the slice area. The parameter measured and mapped may be immersant flow (for example, by tracking displacement of seed particles), immersant temperature (for example, by tracking an optical spectral signature or signature change known to be indicative of a temperature or temperature change), or a combination of both.

In still another aspect of the present invention, a method of optically and non-invasively characterizing an acoustic beam includes the steps of: providing an immersant comprising an immersion medium seeded with a plurality of seed particles; sonicating at least some of the plurality of seed particles with the acoustic beam; illuminating at least some of the sonicated seed particles; tracking at least one optically-detectable parameter of at least some of the illuminated seed particles, thereby generating at least one immersant parameter map; and determining one or more characteristics of the acoustic beam from the at least one immersant parameter map and one or more known properties of the immersant. The immersant may be a water-based immersion medium seeded with a plurality of seed particles that preferably are approximately neutrally buoyant. The immersant may also be adjusted to have tissue-like attenuation and/or thermal characteristics. The seed particles may be pulse illuminated and/or illuminated in a slicewise manner. As described above, displacements, temperatures, or both of the seeded particles may be tracked. Displacements are preferably tracked after an equilibrium flow state is achieved; temperatures are preferably tracked after a thermal relaxation time has elapsed.

The step of back-calculating one or more characteristics of an acoustic beam that results in the at least one immersant parameter map generally includes the steps of: assuming values for the one or more characteristics; modeling behavior in the immersant of an acoustic beam having the assumed values, thereby generating at least one modeled parameter map; comparing the at least one modeled parameter map to the at least one immersant parameter map; and utilizing an optimization algorithm to refine the assumed values for the one or more characteristics. The process may be iteratively repeated until the difference between the modeled parameter map and the immersant parameter map is minimized. The Khokhlov-Zabolotskaya-Kuznetsov non-linear parabolic wave equation and Newton's method may be utilized in this method.

In yet another aspect of the invention, a method of modeling behavior of a high intensity focused ultrasound medical device includes the steps of: acoustically coupling the medical device to an immersant including an immersion medium seeded with a plurality of seed particles, the immersant having tissue-like acoustic and thermal characteristics; activating the medical device to emit high intensity ultrasonic energy into the immersant within a beam envelope; illuminating at least some of the plurality of seed particles within the beam envelope; optically measuring at least one parameter of at least some of the illuminated seed particles; and generating a map of at least one immersant parameter from the at least one optically measured parameter. The optically measured parameter may be displacement or temperature of at least some of the illuminated seed particles, and the map may include corresponding immersant flow or immersant temperature information. It is also contemplated that the effect of the high intensity ultrasonic energy on the tissue-like immersant may be directly observed, for example by deliberately destroying the immersant with the high intensity ultrasonic energy in order to simulate lesioning of tissue.

The foregoing and other aspects, features, details, utilities, and advantages of the present invention will be apparent from reading the following description and claims, and from reviewing the accompanying drawings.

DETAILED DESCRIPTION OF THE INVENTION

The present invention applies optical flow and temperature measurement techniques to characterize high power acoustic beams. The invention also applies numerical modeling techniques to back-calculate the acoustic pressure or intensity fields based on the flow and/or temperatures that are optically measured in a sonicated and seeded test medium. The invention may advantageously be used to directly characterize full power acoustic beams, including modeling the behavior thereof in tissue, thereby avoiding the need to infer high power, non-linear behavior from low power, linear test results. For example, the present invention provides a method of determining an unknown high power ultrasonic beam intensity map from acoustic streaming measurements, acoustic heating measurements, or both acoustic streaming and acoustic heating measurements.

Figure 1:
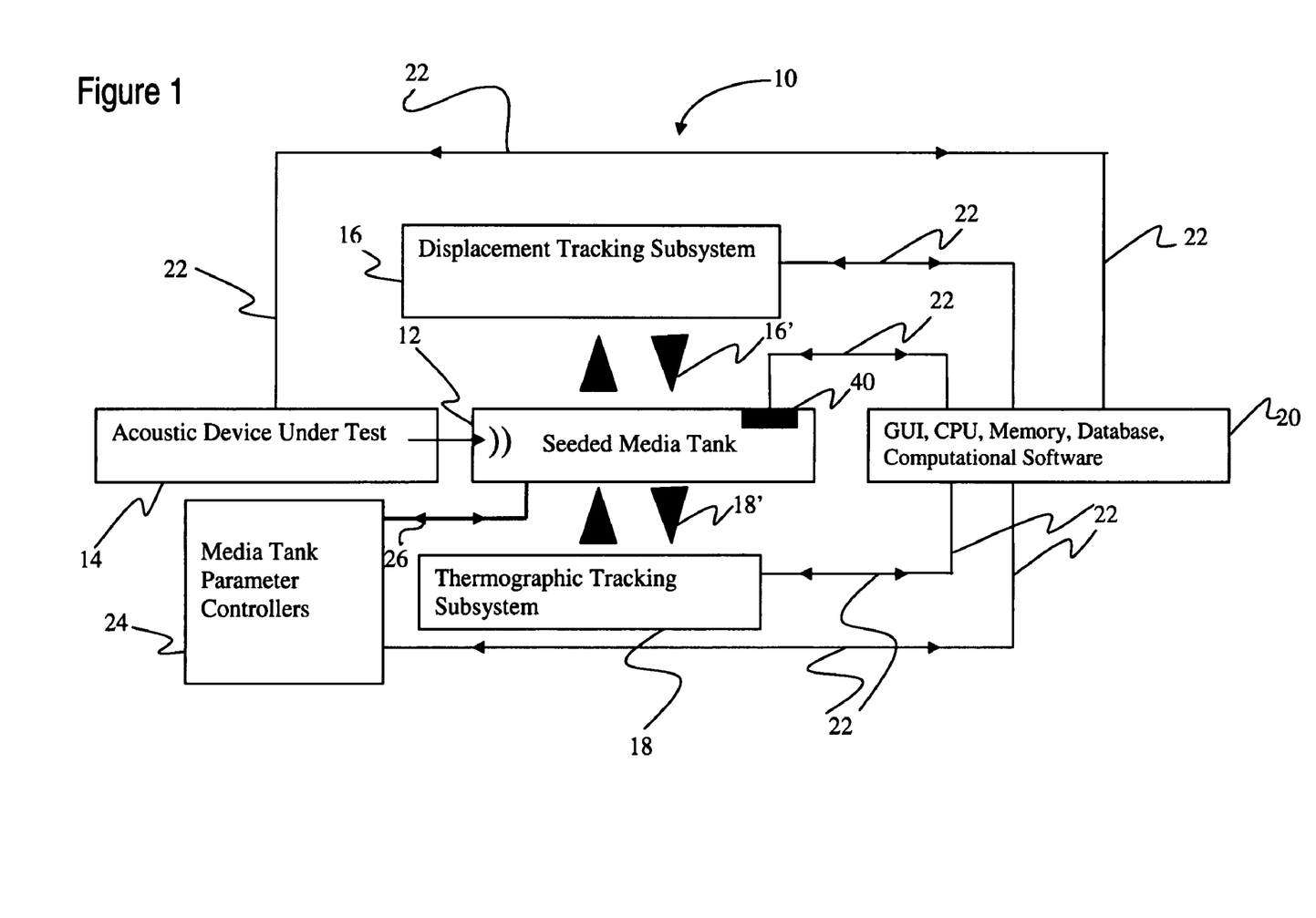
FIG. 1 is a block diagram of an optical testing system for characterization of acoustic beams according to an embodiment of the present invention.

FIG. 1 is a block diagram of an optical system 10 for characterization of acoustic beams according to an embodiment of the present invention. System 10 generally includes a seeded immersant tank 12; an acoustic source 14 to be tested, such as an ultrasound transducer and associated power supply; a displacement (i.e., flow) tracking subsystem 16; a thermographic (i.e., temperature) tracking subsystem 18; and a system controller 20. Controller 20 may be a computer system incorporating a graphical user interface, a processor, memory subsystems, and computational software, and is interconnected to the other elements of system 10 via appropriate power, data, and other connectors 22.

System 10 further preferably includes a tank controller 24 to control tank 12 or its immersant ambient. For example, tank controller 24 may include a thermal controller and/or a controller to disperse seed particulate or seed dye into the immersion medium. An umbilical 26 connects tank controller 24 to tank 12. Umbilical 26 may supply seed particles, temperature-controlled seeded immersant, or an independent tank jacket coolant, for example to assure a known temperature of the seeded immersant within tank 12. Alternatively, or additionally, tank controller 24 may control one or more heat exchangers provided on tank 12 to maintain a preset temperature of the seeded immersant within tank 12. Typically, tank 12 will be maintained at a temperature slightly above room temperature, such as about 25 degrees C., to ensure that the properties of the seeded immersant, such as viscosity, are known, and to minimize errors attributable to temperature variation of the properties of the seeded immersant.

Figure 2:
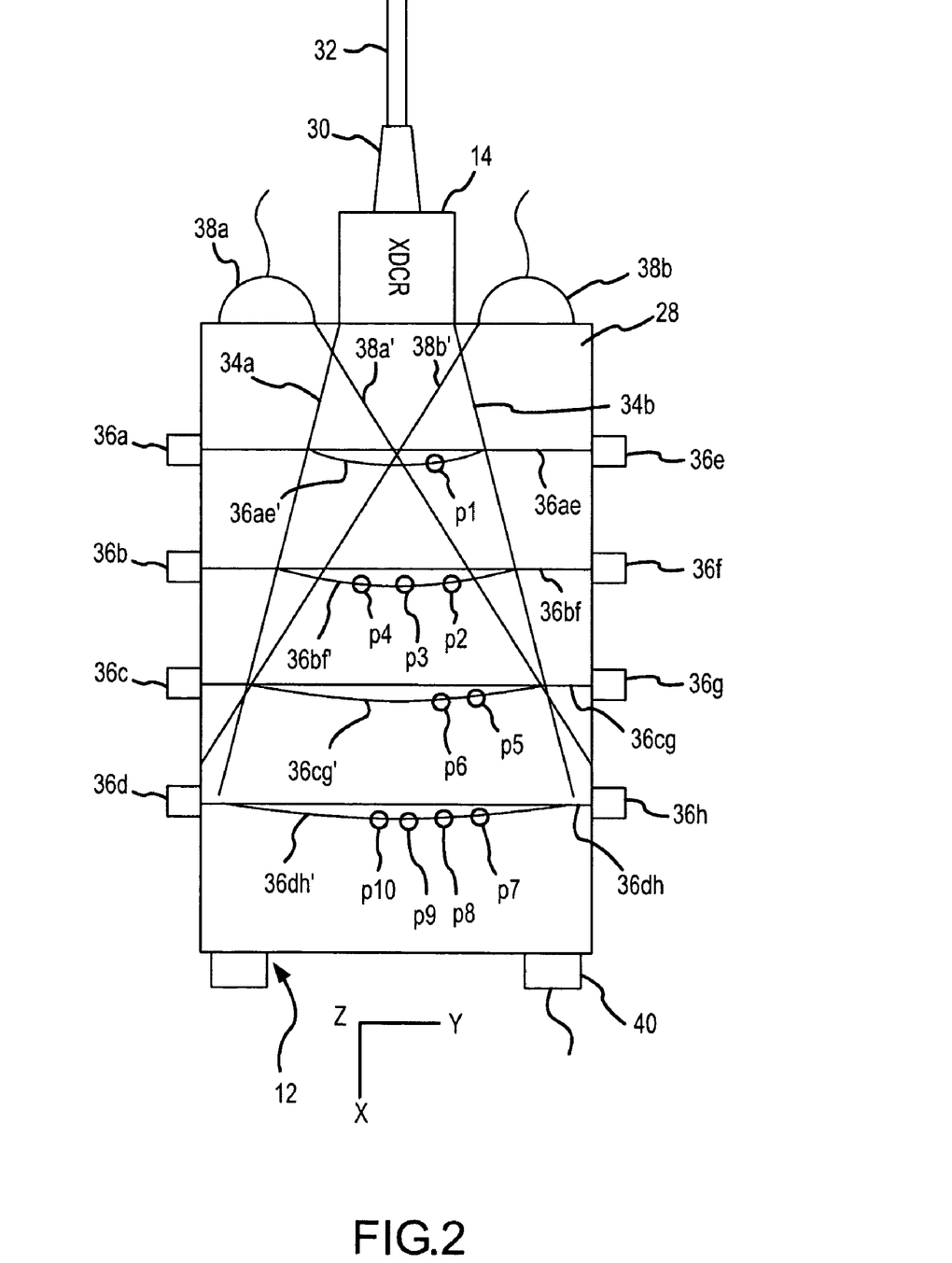
FIG. 2 is a front schematic view of a seeded immersant medium tank that may be used in the optical testing system of FIG. 1.

Tank 12, acoustic source 14, and tracking subsystems 16 and 18 are shown in further detail in FIG. 2. For purposes of explanation, tank 12 has a height along the x-axis, a width along the y-axis, and a depth (into the drawing) along the z-axis; one of ordinary skill in the art will appreciate that the axes used herein are oriented only as a matter of convenience, and could be changed without departing from the spirit and scope of the present invention. One of ordinary skill in the art will further appreciate that the present invention may be practiced to characterize the acoustic beam generated by transducer 14 in one, two, or three dimensions.

A seeded immersant 28 is disposed within tank 12. Ultrasonic transducer 14 under test is acoustically coupled into seeded immersant 28. Transducer 14 includes a strain relief 30 and a connecting cable 32 as generally known in the art. Ultrasound energy from transducer 14 is directed into seeded immersant 28 in tank 12, generally within the confines of a beam envelope defined by lines 34a and 34b. This may be referred to as "sonication" or "acoustic irradiation" of seeded immersant 28.

Transducer 14 may be fired through an acoustic window, such as a thin rubber or urethane window, in the top of tank 12. Alternatively, transducer 14 may itself be immersed in or wetted directly by seeded immersant 28. Preferably, the acoustic output of transducer 14 is coupled into seeded immersant 28 with minimal acoustic coupling loss and distortion in a manner widely known to the art.

Transducer 14 may be operated up to and including at full power, which, as described above, is between about 100 W and about 200 W (or, in terms of power density, between about 1500 W/cm$^2$ to about 3000 W/cm$^2$, as known in HIFU). Though the acoustic coupling between transducer 14 and seeded immersant 28 is depicted as a vertical mounting, any geometry may be utilized, provided it results in reproducible and modelable flow and/or temperature measurements of seeded immersant 28. Transducer 14 may also be hand-held against or within tank 12 or seeded immersant 28.

Seeded immersant 28 is preferably a water-dye or water-particle mixture, suspension, or solution. That is, seeded immersant 28 is preferably a mixture of appropriate seed particles or molecules and a controlled-viscosity, water-based immersion medium.

For the flow-based approach disclosed herein, it is desirable to inhibit turbulent or chaotic flow without significantly increasing the acoustic attenuation of seeded immersant 28. Thus, the viscosity of seeded immersant 28 used in the flow-based approach is preferably about 5 centipoise, which may be achieved via the addition of liquid additives, such as glycerol, to the immersion medium. A preferred immersion medium is Hercules Natrosol L at 2.4% by weight and 0.5% Sigma sodium azide preservative.

The immersion medium may be seeded in any suitable manner of providing suspended, dissolved, or entrained particulates or molecules, including, but not limited to, chemical precipitation before or during the testing of transducer 14. The seed particles preferably exhibit spectral properties, fluorescence, reflectivity, phosphorescence, or other characteristics that allow their physical tracking (i.e., displacement measurement), the measurement of their local temperature, or both. For example, the seed particles utilized in the flow-based approach disclosed herein may be visible under passive reflective illumination or backlighting, while the seed particles utilized in the temperature-based approach disclosed herein may be dyes that fluoresce or phosphorese when laser illuminated.

The term "seed particles" is used herein to refer to both dye molecules, atoms, or ions and to physical particles, such as microparticles and nanoparticles, and the terms "dye" and "particle" are accordingly used interchangeably herein. The term "seed particles" also encompasses physical particles coated or saturated with a dye. Further, the terms "particle" and "particulate" encompass any gas, vapor, liquid, solid, or semisolid material, including microbubbles and cavitation bubbles. Though certain preferred seed particles will be described herein, the invention is not limited to these preferred seed particles, and one of ordinary skill in the art will understand how to select seed particles of appropriate size and characteristics in practicing the various aspects of the present invention.

As described above, the seed particles may be optically tracked for displacement, temperature, or both. For purposes of this disclosure, the seed particles will be described as "fluorescent," which term is intended to encompass all forms of energy reflected, scattered, emitted, or re-emitted by the seed particles upon exposure to radiation, such as from optical devices 36a-36h, that may be used to track seed particle position and/or temperature, whether humanly visible or not. The process of exposing the seed particles to radiation is referred to herein as either "illumination" or "excitation" regardless of the wavelength of the radiation. For example, reflection or scattering of visible light and phosphorescent emission in response to laser radiation are both within the scope of the terms "illumination" and "fluorescent" as used herein. Further, it is not required that seed particle flow or heating be visible to the naked eye; that is, seed particles may be illuminated by, and may fluoresce in, wavelengths that are not humanly visible.

Preferably, the seed particles are smaller than the acoustic wavelength of the acoustic waves in seeded immersant 28, and more preferably are smaller than about 1/10 of the acoustic wavelength. In some embodiments of the invention, the seed particles have a maximum diameter of about 20 microns, and more preferably of about 10 microns, though it should be understood that the particle size may be as small as or nearly as small as molecular-sized for a dye molecule or nanoparticle, may be a few microns for a physical microparticle or microbubble, or may be defined only by an impinging activation beam as by the activation of a few thousand local dye molecules in a particle-sized microdroplet volume defined by an illuminating beam. In at least the flow-based approach disclosed herein, the seed particles preferably have a density of about 0.8 gm/cc to about 1.1 gm/cc (that is, near the 1.0 gm/cc density of a pure water or dilute water solution), and may be approximately buoyancy matched to the immersion medium.

The preferred seed particles for use in the flow-based approach disclosed herein faithfully follow the flow of seeded immersant 28 without substantially interfering with or changing the characteristics of the ultrasound beam. That is, they are substantially acoustically invisible. Suitable seed particles include, without limitation, hollow glass spheres, such as Dantec Dynamics 10 micron hollow glass spheres. The spheres may be coated, for example with metallic silver or nickel, to increase their optical reflectivity. Advantageously, a seeded immersant 28 utilizing such seed particles maintains a generally stable non-turbulent and non-chaotic flow jet at maximum power of transducer 14.

In other embodiments of the invention, the seed particles may be a molecular dye that finely distributes or dissolves itself in the immersion medium. Such a dye advantageously does not limit spatial resolution and facilitates good mix uniformity and stability. In addition, the effective particle size of such a dye may be varied by varying the optical spot size. Dye-based seed particles are well-suited for use in the temperature-based approach disclosed herein, though they may also be used in practicing the flow-based approach.

Seeded immersant 28 is preferably optically transparent or translucent to the wavelengths of optical devices 36a-36h. A human observer may also be able to see into tank 12, though it may appear slightly colored or milky (i.e., translucent). Seeded immersant 28 need not be human-visually transparent or translucent, though this is desirable to simplify setup and operation of system 10.

Though seeded immersant 28 is preferably water-based, in some embodiments of the invention it is contemplated that the methods disclosed herein may be used to model the streaming flow and/or heating of a bodily material such as tissue or blood. Accordingly, one or more additives may be added to the immersion medium to provide acoustic and thermal characteristics to seeded immersant 28 that more closely approximate the bodily material of interest. Such additives include, but are not limited to, gels, milk, cream, glycerin, and mineral oil, the use of which is known in non-flowing image resolution phantoms to attain human-like tissue attenuations. Further, the seed particles themselves may be selected or modified to provide tissue-like attenuative characteristics to seeded immersant 28. The term "tissue-like" refers to seeded immersant 28 having characteristics more closely approximating those of tissue than those of water. Thus, one of ordinary skill in the art will appreciate that seeded immersant 28 can be prepared to have a range of characteristics. For example, seeded immersant 28 may be prepared to be water-like with low attenuation in order to simulate blood, or non-flowing with high attenuation to simulate tissue.

Displacement and thermographic tracking subsystems 16, 18 include a plurality of optical devices 36a-36h and a pair of optical thermographic temperature measurement devices 38a, 38b mounted on tank 12. As described in further detail below, optical devices 36a-36h operate in complementary pairs to define fixed measurement slices 36ae, 36bf, 36cg, and 36dh, which are preferably sequentially illuminated. One of ordinary skill in the art will recognize that, in two dimensions, slices 36ae, 36bf, 36cg, and 36dh may be represented as lines, while, in three dimensions, they may be represented by planes or grids. It should be understood that more or fewer optical devices or thermographic temperature measurement devices may be employed, and that optical devices may be present on one side, two sides, or more than two sides of the illuminated slices. For example, a slice may be defined by a light source provided on one side of tank 12 and a reflector provided on the other side of tank 12.

Additionally, more or fewer slices may be utilized without departing from the spirit and scope of the present invention. Preferably, multiple stacked (i.e., substantially parallel), coaxial, or other spaced slices are utilized in order to sample the three-dimensional volume of seeded immersant 28. Alternatively, this may be accomplished via a scanned beam or a moving illumination source. One way to implement a scanned beam is to utilize the increasingly popular digital light mirror (DLM) chips available from Texas Instruments, which can do beam forming with appropriate microcode. Activated slices may not only be translationally scanned, but may instead or in addition be angularly or rotationally scanned. The slices need not be parallel or coaxial; random or nonsurface-bound arrangements are also regarded as within the scope of the invention. Typically, a slice will be illuminated at one instant, or, alternatively, a slice may be scanned (i.e., drawn) as a laser line is swept across tank 12 in a raster-like manner.

In order to measure seed particle displacements, it is desirable to observe one or more seed particles at two or more instants in time. During the interval between observations, the seed particles should be fluorescing to facilitate optical displacement tracking. Consequently, it is desirable for the flow direction of seeded immersant 28 to lie at least partially in the plane of an illuminated slice, such that the seed particles remain in the illuminated slice long enough to make at least two observations of seed particle position. Thus, the slices will typically be substantially parallel or coaxial with the net streaming direction. Further, it is desirable to measure seed particle displacements substantially orthogonally to the illuminated slice.

Seed particle temperature measurements may be made from any orientation. However, since the seed particles are typically illuminated slicewise, it is desirable to measure temperatures substantially orthogonally to the illuminated slice to permit simultaneous observation of the entire illuminated slice.

It is contemplated that, where both seed particle displacements and seed particle temperatures are tracked, different slices having different orientations may be used for each set of measurements. In at least some embodiments of the invention, however, the same slices are used for both displacement tracking and temperature tracking, with measurements made substantially orthogonally thereto.

It should be clear from the foregoing discussion that there are several possible illumination, tracking, and slice orientations and geometries within the spirit and scope of the present invention. One of ordinary skill in the art will understand how to select suitable orientations and geometries for a particular application of the present invention.

Optical devices 36a-36h are depicted to include both illumination devices (i.e., optical transmitters) to illuminate seeded immersant 28, preferably on a slice-by-slice basis as described above, and optical tracking devices (i.e., optical receptors) to track and map positions of the seed particles, such as representative particles p1-p10, within seeded immersant 28. As described above, the terms "illumination devices" and "illuminate" are utilized herein to refer to all types and functions of optical transmitters regardless of wavelength, human visibility, or whether the seed particles are passively made visible or excited into reemission. The illumination devices may be, for example, solid-state lasers coupled into cylindrical spreading lenses, while the optical tracking devices may be, for example, high-speed digital cameras or photodetectors with viewing angles of activated slices permitting motion and/or temperature of seed particles within that slice to be optically tracked. For the flow-based approach disclosed herein, the optical tracking devices are preferably as described in the article "Design and optimization of a flexible high-peak-power laser-to-fiber coupled illumination system used in digital particle image velocimetry" by Ronald A. Robinson and Ilko K. Ilev, which is expressly incorporated by reference as though fully set forth herein.

For purposes of this disclosure, each optical device 36a-36h will be described as including both an illumination device and an optical tracking device. Thus, optical devices 36a and 36e illuminate slice 36ae and track the position and/or temperature of seed particles within or moving through slice 36ae; optical devices 36b and 36f illuminate slice 36bf and track the position and/or temperature of seed particles within or moving through slice 36bf; and so forth. It should be understood, however, that optical devices 36a-36h may operate in complementary pairs, with one member of each pair being an optical transmitter and the other member being an optical receptor, optionally oriented orthogonally to each other, or any other arrangement without departing from the present invention.

Optical devices 36a-36h are preferably solid-state devices offering the advantages of compactness and simple operation. Optical devices 36a-36h may optionally be coupled to optical lenses or dispersers in order to form a light sheet, grid, line, or surface within seeded immersant 28 or to form a thermographic image of an illuminated slice. In addition, optical devices 36a-36h preferably do not use moving parts (i.e., mirrors) to measure displacement or temperature of seed particles, relying instead on non-moving imaging devices such as CMOS, CCD, GaAs, or DLM devices.

When a particular slice (i.e., slice 36ae) is illuminated by its corresponding optical devices (i.e., optical devices 36a, 36e), the slice becomes transiently fluorescent as the seed particles within that slice fluoresce, thereby forming a momentarily visible (at least to the measuring device, such as optical devices 36a-36h or optical thermographic temperature measurement devices 38a, 38b) line, sheet, or grid (i.e., line 36ae) within seeded immersant 28. Typically, decaying fluorescence persists on the order of several seconds; for some seed particles, it may persist on the order of minutes. For other seed particles, fluorescence may persist on the order of milliseconds or hundreds of milliseconds. Preferably, the seed particles are selected to have a relatively short fluorescent decay time, typically on the order of less than a second, and more preferably on the order of milliseconds or less. Coupled with pulsed activations of optical devices 36, a short fluorescent decay time permits several position and/or temperature measurements for the seed particles within seeded immersant 28, which may be ensemble averaged. In some preferred embodiments of the present invention, between about 50 and about 100 motion-tracking image pairs, with an interval of about 66 ms between images in each image pair, are ensemble averaged.

Optical thermographic temperature measurement devices 38a, 38b are shown observing the activated slices in a generally orthogonal manner to track seed particle temperatures. Optical thermographic temperature measurement devices 38a, 38b have corresponding fields of view indicated, respectively, by lines 38a' and 38b', such that the temperature of any point on an orthogonal slice (e.g., slice 36ae) can be optically measured. For example, representative seed particle p1 can have its temperature measured by thermographic sensor 38b. Similarly, points p2-p4 can have their temperatures measured by thermographic sensor 38a. Though temperature measurement devices 38a, 38b are depicted as orthogonal to the activated slices in FIG. 2, temperature measurements may be made at any orientation with respect to the acoustic beam, particularly in a stagnant seeded immersant 28, without departing from the spirit and scope of the present invention.

As will be described in detail below, thermographic sensors 38 measure temperatures after the seed particles have been illuminated by optical devices 36, causing the seed particles to emit fluorescence indicative of their temperatures. Thermographic sensors 38 may be any type of sensors that measure temperature optically (that is, based on seed particle fluorescence), including, without limitation, infrared thermographic sensors and ultraviolet thermographic sensors.

It will be apparent to one of ordinary skill in the art that the illumination energy emitted by optical devices 36a-36h must pass through a finite range of intervening seeded immersant 28 and retain a minimal intensity in order to illuminate the seed particles in a given slice. Further, assuming the seed particle is illuminated by the incoming energy, any returned energy must propagate through a finite range of intervening seeded immersant 28 and still be visible to optical devices 36a-36h for seed particle tracking. Accordingly, in some embodiments, it is contemplated that only a portion of tank 12 where measurements will be made, such as within the beam envelope, may be seeded, thereby minimizing losses as the energy travels through tank 12 and improving the efficacy of the present invention.

In summary, tank 12 contains a seeded immersant 28 into which an ultrasound beam, and preferably a high intensity ultrasound beam at or near maximum power, is fired. The sonicating ultrasonic energy causes acoustic streaming and/or acoustic heating of seeded immersant 28. During sonication, the seed particles within seeded immersant 28 are illuminated via optical devices 36, and the seed particles fluoresce in response. Seed particle positions, temperatures, or both are monitored non-invasively via the seed particle fluorescence using at least one optical technique or wavelength. Measurements of seed particle position and/or temperature over time allow calculation of incremental seed particle motion vectors and/or the incremental temperature changes of the seed particles, thereby permitting generation of an immersant flow map, an immersant temperature map, or both an immersant flow map and an immersant temperature map. The immersant flow map and the immersant temperature map are referred to collectively herein as "immersant parameter maps." Specific embodiments will be described below.

In a first aspect of the present invention, the acoustic beams emitted by transducer 14 are characterized using acoustic streaming flow measurements. It is known that the flow or motion of pumped, forced, or convected fluid streams can be non-invasively mapped in three dimensions over time by utilizing particle imaging velocimetry (PIV) or particle tracking velocimetry (PTV) techniques. The principal difference between PIV and PTV is that the latter tracks individual particles whereas the former tracks groups of particles. The PIV technique has been widely used in studies involving forced and convective flow in ducts, lumens, microchannels, and even in supersonic airstreams. Essentially, the flowing fluid under study (i.e., the immersion medium) is seeded with optically visible (at least to a recording camera, if not also to the naked eye) seed particles or droplets that are carried along the flow while representatively entrained in it. The seed particles are typically chosen to be approximately neutrally buoyant to avoid undesired settling or inertial effects. One of ordinary skill in the art will understand how to select a suitable seed particle for a PIV technique, such as the flow-based approach disclosed herein.

One or more seed particles are pulse illuminated or continuously illuminated and imaged to track their motion over a time interval. The resulting data is used to calculate a displacement vector for the interval for the tracked seed particle or group of seed particles. By doing this over time and three-dimensional space, one can directly monitor the three-dimensional flow of a seeded flowing fluid (i.e., a seeded immersant). The seed particles may be made visible as by reflection, scattering, or masking of a laser beam, or as by particle phosphorescence caused by an impinging laser beam (both of which are within the definition of "fluorescence" as that term is used herein).

Ultrasound streaming flow rates may have a very wide range depending on the specific application. For example, HIFU induced fluid flow in tissue/blood portions might range from about 0.05 cm/sec to about 10 cm/sec. The lowest values might correspond to low power flow through perfused tissues, whereas the higher values might correspond to high power flow in a blood pool.

In general herein, the seed particles are used to visualize the flow of seeded immersant 28. Thus, from an acoustic point of view, the acoustically-streamed seeded immersant 28 has composite acoustic and thermal properties of both the immersion medium and the seed particles therein; preferably, the seed particles are chosen such that the composite properties of seeded immersant 28 are not substantially different than the properties of the immersion medium alone.

It is generally desirable that the seed particles do not move through the immersion medium at a faster rate than the immersion medium itself moves, as might be the case if the seed particles had significantly different acoustic impedance than the surrounding immersion medium. In general, one can choose the seed particles such that they are more or less carried along by the streamed immersion medium by choosing them to have similar acoustic impedance and density to the immersion medium. Choosing the seed particles to be small and non-clumping also assures that the seed particles are, for all intents and purposes, moving with the immersion medium, as opposed to being themselves acoustic targets that are forced or driven differently than the immersion medium. That is, the seed particles are preferably chosen so that the velocity of the seed particles relative to the immersion medium is small compared to the velocity of seeded immersant 28 itself.

Preferably, tank 12 is large enough to prevent acoustic end reflections or counteracting streaming backflow. Further, tank 12 should be large enough that a significant streaming action takes place via attenuative mechanisms. Tank 12 may be designed in a manner such that circulating flow may take place, wherein replacement seeded immersant 28 arrives from, for example, the back or sides of transducer 14. Such a scheme could be offered, for example, by a racetrack loop tank 12, wherein flow is driven around the entire loop by a series of flow baffles. One advantage of a racetrack loop tank 12 is the substantial elimination of flow-restrictive boundary conditions, thus simplifying modeling assumptions. Preferably, a racetrack loop tank 12 is axisymmetric with the beam and uniform around all parts of the beam when looking along the beam axis.

As described above, optical devices 36a-36h are activated, and preferably pulse activated, to sequentially illuminate slices 36ae, 36bf, 36cg, and 36dh and track seed particles therein or therefrom. As should be clear from the foregoing discussion, when transducer 14 is off, seeded immersant 28 is substantially stagnant, and optical devices 36a-36h draw straight lines or planes 36ae, 36bf, 36cg, and 36dh in seeded immersant 28 when activated, and detect little or no motion of the seed particles entrained in seeded immersant 28.

If transducer 14 is turned on, however, the acoustic energy emitted by transducer 14 will cause localized acoustic streaming of seeded immersant 28 in and near the beam envelope. Greater streaming will occur near the center of the beam envelope than on the periphery of the beam envelope. Thus, as the seed particles displace along the x-axis, the slices will be bent into the depicted curved shapes 36ae', 36bf', 36cg', and 36dh'. As one of ordinary skill in the art will recognize, the curved shapes 36ae', 36bf', 36cg', and 36dh' occur after some flow has taken place, such as tens or hundreds of milliseconds after lines 36ae, 36bf, 36cg, and 36dh were originally written or activated in their straight or flat state.

Optical devices 36a-36h will typically sequentially pulse illuminate each slice, thereby causing the seed particles therein, such as representative seed particles p1-p10, to momentarily fluoresce as they are acoustically streamed. While the seed particles fluoresce, optical devices 36a-36h measure their displacement, for example by capturing image pairs depicting the movement of the seed particles over time. In the preferred embodiments of the invention, the pulse repetition rate is about 15 Hz, and the interval between images in a single pair may vary between about 1 microsecond and about 10000 microseconds, and more preferably between about 2000 microseconds and about 3000 microseconds. By way of example only, an image pair may be captured about every 66 ms.

As one of ordinary skill in the art will appreciate, the preferable interval between images for a single image pair is related to the velocity of the seed particles, and will typically be selected such that the motion of a given particle or group of particles may be tracked by comparing the images in the pair. Therefore, for higher velocities, a shorter interval is preferable, lest a given seed particle or group of seed particles move out of frame before the second image is captured. On the other hand, for slower velocities, a longer interval is preferable, lest it appear that the seed particle or group of particles is stationary.

Preferably, displacement measurements are made after an equilibrium flow state is attained, which may take between about 10 seconds and about 500 seconds, depending partially upon the type and construction of tank 12. For example, the racetrack loop tank 12 described above utilizes flow baffles to minimize back pressure, thereby reducing the time necessary to achieve an equilibrium flow state. After equilibrium is reached, a series of measurements at multiple slices may be made over an averaging period of about 5 seconds to about 10 seconds, and in some embodiments of the invention of several minutes, and the measurements may be ensemble averaged to create an immersant flow map that characterizes the streaming effects of transducer 14 on seeded immersant 28. As described above, in the preferred embodiments of the invention, about 50 to about 100 image pairs, captured at an interval of about 66 ms per image pair, are ensemble averaged in creating the immersant flow map. Thus, optical devices 36a-36h permit the three-dimensional characterization of the flow of seeded immersant 28 under the influence of ultrasonic exposure to one or more transducers 14. Automation may be applied to the data taking and system activation, such that substantially the entire characterization is automatically done. Alternatively, automation may be applied only to system startup and stabilization. Automation may be provided via suitable programming of controller 20 (FIG. 1).

One of ordinary skill in the art should appreciate that any number of measurement slices may be utilized, and that one or more optical devices 36a-36h may be scanned, either beam-steering-wise or physically, to obtain a larger number of slices than the four shown and described. Further, for high resolution measurements, flow displacements will typically be tracked at a plurality of locations on each slice rather than only at a handful of representative points p1-p10.

Further, though FIG. 1 depicts the slices as being orthogonal to the acoustic beam central axis (i.e., in the y-z plane), the slices may also be arranged parallel to the beam central axis (i.e., in the x-z plane). In this approach, one would measure the displacement of seed particles as they generally pass along the plane at least for short distances before exiting the plane. This arrangement is preferable when utilizing solid seed particles immersed in a water-like immersion medium and digital CCD or CMOS optical receptors oriented orthogonally to the seed particles to measure seed particle position.

As should be clear from the foregoing discussion, the slices shown are merely exemplary; the flow measurements may take place anywhere within tank 12, and in any orientation relative to the acoustic beam, provided that displacement measurements are made relative to a known reference system. Thus, it is also within the scope of the present invention to compute motion vectors for the seed particles as the vector sum of two or more sub-vectors measured in two or more different planes or slices.

In addition, it is desirable to identify the true acoustic streaming peak velocity profile within the beam envelope (that is, it is desirable to find the "heart" of the ultrasonic energy emitted by transducer 14). This may be accomplished by first visually observing the flow of seeded immersant 28, and then scanning the beam envelope utilizing optical devices 36a-36h. For example, about 10 to about 15 scans may be made at about 0.25 mm increments, and about 50 image pairs may be ensemble averaged for each increment. The peak velocity profile can be easily identified from the results of the scan. The methods described in the article "TRUE Resolution PIV: A Mesh-free Second Order Accurate Algorithm" by Luiz M. Lourenco and A. Krothapalli, which is expressly incorporated by reference as though fully set forth herein, may also be employed to facilitate accurate determination of the peak velocity profile within seeded immersant 28. The automation described above may include such peak determination, as well as the alignment of a set of planes relative to the peak and its propagation axis.

Thus, in the flow-based approach to measuring HIFU power, seeded immersant 28 is streamed, and the acoustic beam intensity map required to cause the observed flow may be back-calculated from the resultant immersant flow map as described below. Typically, the flow is measured on a slice-by-slice basis, wherein the multiple measured slices define the three-dimensional volume of interest. Within each slice, optical devices 36a-36h track the motion of seed particles in order to compute displacement vectors. By measuring multiple adjacent slices, one may acquire a three-dimensional picture of the flow state of the seeded immersant 28; this is especially desirable when characterizing a full-beam volume, which often has seed particles streamed at a variety of angles depending on spatial positions.

If the objective is simply to compute the three-dimensional acoustic intensity map of the beam, it is not necessary for seeded immersant 28 to closely emulate bodily tissues or fluids in terms of acoustic and thermal properties. Rather, one need only know the composite thermal and acoustic properties of seeded immersant 28. If, however, the objective includes physically spatially simulating a streaming flow of a bodily material, for example the effect of transducer 14 on a pool of blood in a patient's heart, it is also desirable for seeded immersant 28 to acoustically and thermally mimic that bodily material.

In another aspect of the present invention, the acoustic beam emitted by transducer 14 is characterized using temperature measurements. The temperature-based approach to acoustic beam characterization may utilize either a flowing immersion medium or a non-flowing (i.e., stagnant) immersion medium seeded with temperature-indicating seed-particles. Characterization utilizing a stagnant seeded immersant 28 will be described herein, but one of skill in the art will understand how to modify the description herein to practice the invention in a flowing seeded immersant.

Seed particles utilized in a stagnant seeded immersant 28 need not be neutrally buoyant, and need not be displacement-monitored, as they are preferably physically entrapped and supported in a non-flowing, semi-solid immersion medium, such as a gel-based material. Further, if a stagnant seeded immersant 28 is used, tank 12 should be large enough such that there are no acoustic end reflections, thereby causing complete attenuation of the beam energy in a single passage of the beam energy through tank 12.

The seed particles utilized in the temperature-based approach to acoustic beam characterization may or may not be the same as those utilized in the flow-based approach. Preferably, the thermographic seed particles utilized in the temperature-based approach exhibit an optical behavior when illuminated that is a monotonic function of temperature. For example, when the seed particles are illuminated by pulse-activated optical devices 36a-36h, they may return an fluorescent emission spectra whose spectral form is a predictable changing function of the seed particle temperature. Assuming the seed particles are small and thermally conductive, one can assume that they are quickly at the same temperature as the surrounding immersion medium. Thus, one can deduce the local temperature from the spectra emitted by a seed particle at a particular location within seeded immersant 28.

Though there is no acoustic streaming where a completely stagnant seeded immersant 28 is utilized, thermal engineers and acousticians will recognize that a seed particle, when sonicated, may heat somewhat differently than its surrounding immersion medium for a variety of reasons, including the seed particle having different acoustic and thermal properties than the surrounding immersion medium. Thus, only after transducer 12 is turned off and the seed particles thermally equilibrate with the surrounding stagnant immersion medium will their temperature be fully representative of the local temperature of the immersion medium. The time that required for the seed particles to thermally equilibrate with the immersion medium is known as the thermal relaxation time, and is a function of the seed particle's and immersion medium's thermal conductivities and specific heats. Thermal relaxation times are generally on the order of milliseconds, though seed particles of the preferred size of less than about 20 microns have thermal relaxation times on the order of tens to hundreds of microseconds.

As in the acoustic streaming embodiment, optical devices 36a-36h are preferably pulse activated to sequentially activate slices 36ae, 36bf, 36cg, and 36dh. When transducer 14 is turned on, the acoustic energy emitted by transducer 14 will cause localized heating of seeded immersant 28 in and near the beam envelope. The temperature profile of seeded immersant 28 is measured, for example via optical devices 36a-36h, optical thermographic measurement devices 38a, 38b, or some combination thereof, effectively utilizing the seed particles as local thermometers. Preferably, as stated above, temperature is measured after the thermal relaxation time has elapsed in order to ensure that the temperature of the seed particles accurately reflects the temperature of the surrounding immersion medium (much like displacements are measured after establishment of an equilibrium flow state in the acoustic streaming embodiment). A series of such measurements may be made over a period of time, such as over several minutes, and the measurements ensemble averaged to create an immersant temperature map that characterizes the heating effects of transducer 14 on seeded immersant 28. The acoustic beam intensity map required to cause the observed temperature map may be back-calculated from the resultant immersant temperature map as described below.

As with the flow-based approach, if the objective is merely to compute the three-dimensional acoustic intensity map of the beam, it is not necessary for seeded immersant 28 to closely emulate bodily tissues or fluids in terms of acoustic and thermal properties. Rather, one need only know the thermal and acoustic properties of seeded immersant 28. If, however, the objective includes physically spatially simulating heating of a bodily material, for example to model the effect of a HIFU ablation device on liver or prostate tissue, it is also desirable for seeded immersant 28 to acoustically and thermally mimic that bodily material. Where seeded immersant approximates a bodily material, seeded immersant 28 may also be destroyed by the beam, for example to simulate the creation of tissue lesions.

In another aspect of the present invention, acoustic beams are characterized by combining both the flow-based approach and the temperature-based approach disclosed herein. This may be accomplished by utilizing a single type of seed particle suitable for both displacement and temperature measurements, or by utilizing one type of seed particle for displacement measurements and a second type of seed particle for temperature measurements either simultaneously or sequentially. The resultant seeded immersant 28 is permitted to flow; temperatures may be measured before, during, or after deformation of lines 36$ae$, 36$bf$, 36$cg$, and 36$dh$ to curves 36$ae'$, 36$bf'$, 36$cg'$, and 36$dh'$. Preferably, displacements are measured after an equilibrium flow state has been attained, while temperatures are measured after the acoustic energy has been attenuated to produce the maximal heating of which it is capable and after the thermal relaxation time has elapsed. A series of such measurements may be made over a period of time, as described above, and the measurements ensemble averaged to create the immersant flow map and the immersant temperature map.

As previously described in connection with both the flow-based and temperature-based approaches, if the objective is only to acoustically characterize a beam in three dimensions (e.g., determine an acoustic intensity map), it is not necessary for seeded immersant 28 used in the combined approach to have tissue-like properties. Nonetheless, it is preferable to have a majority of the acoustic energy converted into measurable flow and/or temperature maps in order to enhance the accuracy of the methods. Thus, in a flow-only based approach, it is desirable for most of the sonicating energy to be converted into immersant momentum, while, in a temperature-only based approach, it is desirable for most of the sonicating energy to be converted into immersant heat.

Once the flow and/or temperature maps are generated, the three-dimensional spatial and temporal characteristics of the acoustic field necessary to cause the observed displacements and/or heating (that is, the immersant flow and/or temperature maps) may be back-calculated using numerical methods. "Back-calculation" refers to a process whereby a result is known and the unknown inputs necessary to achieve that result are reached through an iterative process of guesses and refinements to those guesses. For example, in the present invention, the immersant parameter map is known, having been measured as described above. The acoustic power characteristics yielding the immersant parameter map (which may be collectively referred to as the "acoustic intensity field") are unknown, but can be determined using the iterative back-calculation numerical algorithm described herein.

Figure 3:
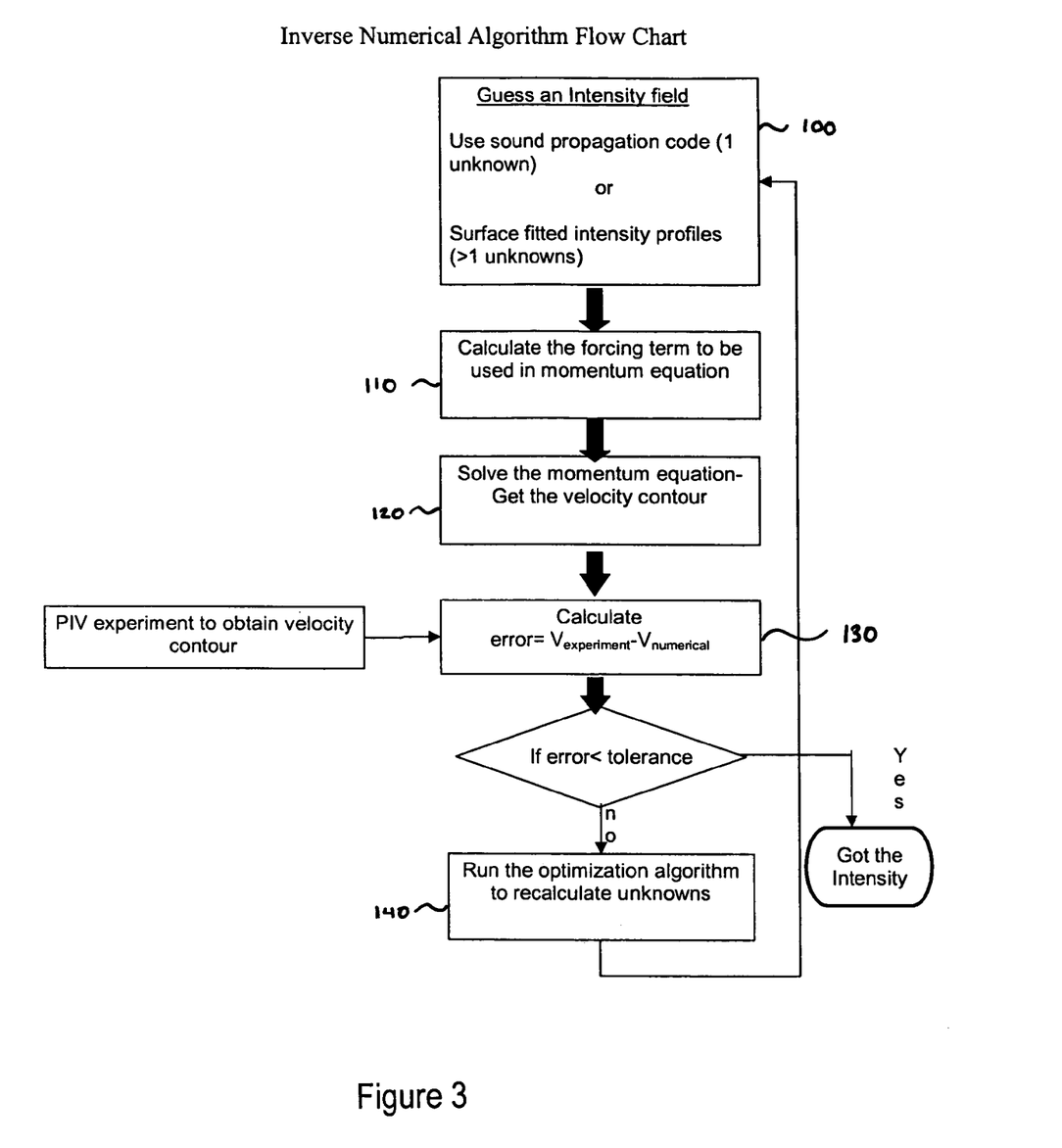
FIG. 3 is a flowchart illustrating steps that may be carried out in back-calculating the acoustic beam intensity required for the observed and measured data.

An algorithm for back-calculating the acoustic intensity field in the flow-based approach is illustrated in FIG. 3. The algorithm illustrated in FIG. 3 generally includes three different stages of computation:

1) Modeling non-linear sound propagation and calculating the acoustic intensity field;

2) Computing the streaming velocity generated by the acoustic intensity field calculated in stage 1; and 3) Comparing the experimental and computational results and recalculating the values for unknowns (if necessary).

In the first stage, initial guesses are made for the unknown parameters characterizing the transducer (step 100). These parameters might include total power, the parameters used to model the pressure profile across the face (e.g., fitting parameters for a Gaussian distribution), and the transducer focal length. To determine the acoustic intensity field based upon the guessed parameters, a sound propagation code, such as the Khokhlov-Zabolotskaya-Kuznetsov (KZK) equation may be used.

In step 110, the guessed parameters are then used to model the acoustic propagation in the attenuating medium (recall that seeded immersant 28 has one or more known acoustic or thermal properties). Preferably, the guessed parameters are input into the KZK non-linear parabolic wave equation. The KZK equation accounts for combined effects of diffraction, absorption, and non-linearity. The acoustic pressure field is obtained from the KZK equation by employing a time domain numerical algorithm. From the pressure values, a time averaged acoustic intensity field is obtained. The driving force, which accounts for momentum transfer from the sound field to fluid, is estimated from the acoustic intensity field.

In the next stage, acoustic streaming motion is modeled using continuity and momentum equations for a viscous, incompressible fluid (step 120). The momentum equation contains the forcing term consisting of the driving force derived from the acoustic intensity field in the first stage. The relevant equations are solved numerically in a computational model of the streaming apparatus, thereby arriving at a numerically modeled immersant flow map for an acoustic beam having the guessed characteristics.

Finally, axial and radial velocity profiles obtained from the computations are compared with the experimental values (i.e., the immersant flow map) in step 130. If the error between the two is below a tolerance, then the algorithm is complete; the guessed parameters characterize the acoustic beam. If the error is greater than the tolerance, an optimization routine, such as Newton's method, is employed to refine the initial guesses for the transducer characterization parameters (step 140), and the process is repeated. Typical tolerances are in the range of about 2% error to about 20% error, with greater error permissible at higher maximum acoustic powers, and thus higher streaming velocities. The parameter set that minimizes the difference between the computed and measured velocity fields is used in the KZK equation to compute the final estimate for the ultrasound intensity field.

For a stagnant medium, the temperature at select points within the ultrasound beam is inferred form the fluorescent spectrum measured at the desired locations. To determine the acoustic intensity field from the measured temperature values, an iterative process analogous to that described above may be employed. Thus, using initial guesses for the transducer characterization parameters in the KZK equation, an initial estimate for the acoustic intensity field is computed. The acoustic intensity field is used with a known absorption value (possibly temperature-dependent) to compute a temperature field using heat-conduction equations. The difference between the measured and computed temperatures at the reference locations is calculated. A multi-dimensional optimization algorithm is used to refine the guess for the transducer characterization parameters, and the process is repeated. The set of parameters that minimizes the difference between the computed and observed temperature values is used in a final simulation with the KZK equation to obtain the best estimate for the ultrasound intensity map.

Figure 4:
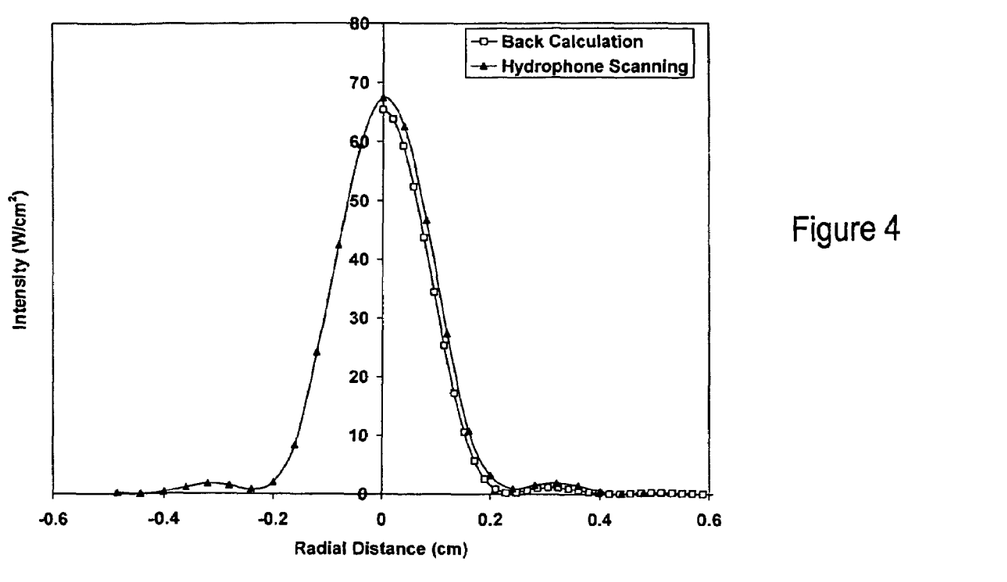
FIG. 4 illustrates a radial intensity plot calculated according to the present invention as compared to a radial intensity plot directly measured utilizing industry standard hydrophone measurement methods.
Figure 5:
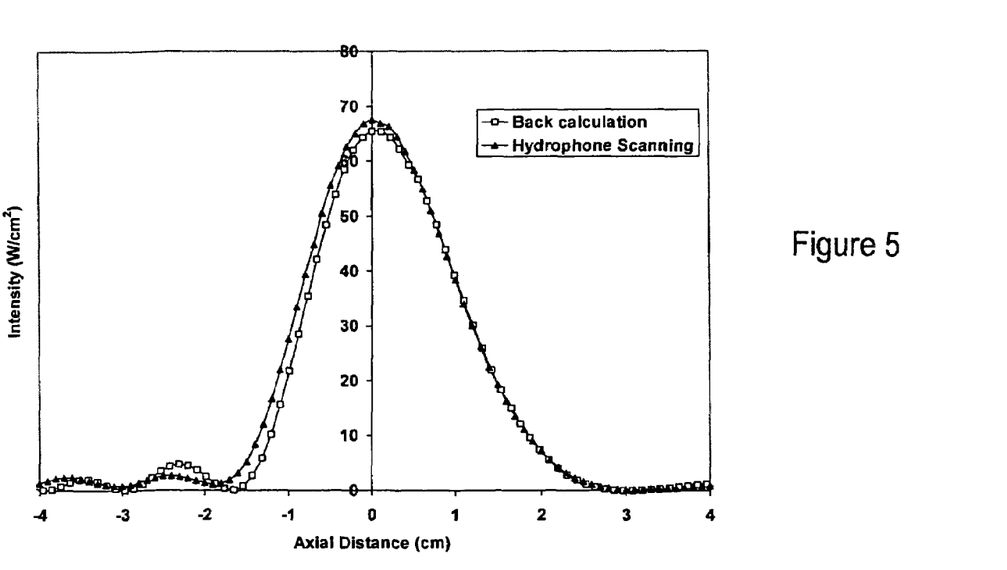
FIG. 5 illustrates an axial intensity plot calculated according to the present invention as compared to an axial intensity plot directly measured utilizing industry standard hydrophone measurement methods.

As illustrated in FIGS. 4 and 5, the numerical back-calculation method disclosed herein compares favorably to the industry standard methods for low-power measurements of beam intensity discussed above. For example, for a power of about 1 W to about 2 W, the back-calculation method disclosed herein is within about 10% of the value measured using industry standard hydrophone scanning methods.

Advantageously, the numerical back-calculation method disclosed herein is also highly predictive of high-power behavior. For example, at a power greater than about 100 W (that is, maximum power of transducer 14), the numerical back-calculation method disclosed herein is within about 15% of the true acoustic power measured with a laboratory radiation force balance system.

A hydrophone 40 (FIGS. 1 and 2), which is preferably located outside of the intense portion of the beam envelope 34a, 34b, may be utilized to provide basic spectral-content information regarding the emanating beam and to therefore reduce the time it takes to back-calculate the beam parameters, for example by providing data upon which the initial guesses may be based or refined. Hydrophone 40 may also provide an indication of boiling and/or cavitation events, which may or may not be intended depending upon the intent of a particular test.

One example of the operation of system 10 will be described with reference to FIG. 1. Ultrasonic transducer 14 is coupled into tank 12 containing seeded immersant 28. Controller 20 activates transducer 14 and waits until an equilibrium flow state is attained (e.g., between about 10 seconds and about 500 seconds, and preferably about 300 seconds, depending on factors such as tank size, tank geometry, immersant viscosity, and transducer acoustic intensity). Controller 20 can then order displacement tracking subsystem 16 to create initial ($t_0$) fluorescing flow indicator lines, grids, or seed particle positions. For the combined methodology, controller 20 can concurrently order thermographic tracking subsystem 18 to map the initial temperatures on these lines, grids, or seed particle positions. Inputs and outputs between subsystems 16, 18 and tank 12 (i.e., emissions from and seed particle positions measured by optical devices 36a-36h) are shown by arrows 16' and 18', respectively.

A short time later, for example according to the intervals described herein, the seed particle positions and/or temperatures are remeasured. The known time increment and known seeded immersant 28 acoustic and thermal properties allows an array of position and/or temperature deltas to be computed. The time increment may be adjustable for a given point or region in order to allow for maximal sensitivity over a wide range of flows and temperature changes. As described herein, a series of such measurements may be made over a period of time, such as about 5 minutes, and the measurements may be ensemble averaged to create the immersant parameter map or maps.

Controller 20 then determines, using closed form equations or finite element models, such as the numerical back-calculation method disclosed herein, the three-dimensional spatial and temporal characteristics of the acoustic field that is necessary to produce the observed displacements and/or heating (that is, the immersant flow map and/or immersant temperature map).

It should be understood that one may choose to power transducer 14 in one or more manners, in one or more functional modes, at one or more frequencies, and at one or more power levels. Transducer 14 may even be a steered beam-array device that is tested at different steering angles, intensities, or operational modes. Therefore, as described above, the user may utilize any desired number of slices and/or optical devices. The user may further operate transducer 14 in short single-pulse or continuous-wave bursts as described above, or may even operate transducer 14 in a steady state emission configuration wherein a steady state flow pattern, and possibly temperature map, are attained and maintained. In the case where transducer 14 is an imaging transducer or other medical device, the user may fire it in one or more of its intended operational modes, for example to model the behavior of a HIFU ablation device during an ablation procedure. Advantageously, an imaging transducer may be used not only to sonicate the seeded immersant, but also to track seed particle positions, thereby resulting in a transducer that effectively measures its own performance.

It is also regarded as within the scope of the present invention to test transducer 12 in two different seeded immersants 28. For example, physically representative flow/streaming, or acoustic intensity mapping alone, may be determined using one seeded immersant 28 and physically representative heating effects may be determined using a second seeded immersant 28. Alternatively, both flow and temperature may be mapped using two different seeded immersants 28 having different attenuation levels. In this instance, one could examine difference maps of flow and/or temperature and relate them to known differences in one or more acoustic properties.

A "field expedient" implementation of system 10 is also contemplated. Such an implementation provides users with an ongoing process monitor for ultrasound and HIFU equipment. For example, the acoustic beam characteristics determined by the process described herein may be compared to the expected or as-designed beam characteristics. This implementation optionally provides the user with a go/no-go test result. For example, if there is a significant disparity between the calculated beam characteristics and the expected or as-designed beam characteristics, it might indicate a problem with the ultrasound or HIFU equipment.

If one were designing a HIFU surgical or therapy device, such as an ablation device, one would likely be interested in the three-dimensional time vs. temperature map of what exposed tissue might do in response to the treatment beam. By choosing a stagnant seeded immersant 28 with tissue-like acoustic and thermal properties, one could advantageously observe, using the temperature-based methods disclosed herein, the evolution of the thermal plume formed in the tissue-like stagnant seeded immersant 28. Similarly, if one were designing a HIFU surgical or therapeutic product wherein it is known that, over the time of an acoustic exposure, significant mass-transfer of movable materials (e.g., blood, drugs) takes place in the acoustic field, the flow-based methodology disclosed herein could advantageously be used to predict the behavior of the HIFU product under design.

Flowed-Medium Working Example

In a first working example of system 10, a Lucite test chamber holds a seeded immersant of degassed water (<1 ppm dissolved oxygen or <25% dissolved gases) seeded with seed particles (Dantec silver-coated hollow glass spheres, Dantec hollow glass spheres with diameters of 10±10 microns, or equivalent particles). A 0.5-1 mm PZT (lead zirconate titanate) hydrophone is positioned near the geometrical focus of a HIFU transducer, and the approximate transducer focal region is found by moving the hydrophone in the x-, y-, and z-directions until the maximum hydrophone signal is attained. The 0.5-1 mm laser sheet is aligned with the hydrophone, and a digital PIV distance calibration is performed with the known dimensions of the hydrophone. The hydrophone is removed from the test tank. A CCD camera is focused on the particles illuminated by the laser sheet, and 50 image pair captures are recorded after steady state conditions are met (e.g., 5 seconds after ultrasound is activated). A digital PIV cross-correlation algorithm is performed on the 50 image pairs to produce an average velocity magnitude plot of the HIFU focal region at a particular acoustic power level. These acoustic streaming velocity magnitude plots are then used in a computational model to predict the actual acoustic intensity distribution in the focal region, as well as the predicted temperature distribution.

Stagnant Medium Working Example

In a second working example of system 10, a Lucite test chamber is filled with a medium consisting of a hydrogel (Gelrite™) plus glycerin (for ultrasound absorption) and two fluorescent dyes (Rhodamine chloride 560 and Sulforhodamine 640, both excited at 532 nm laser wavelength). The hot spot of the focal region of the HIFU source is located using a 0.5-1 mm thermocouple needle probe. The planar laser sheet is then aligned with the tip of the thermocouple and orthogonal with a CCD camera. Special optical notch and passband filters are used with the CCD camera to record the two emitted wavelengths from the two dyes (520 nm and 600 nm) that will use digital subtraction techniques to remove the systematic laser illumination variation in the images. Multiple images are recorded for ensemble averaging to reduce random error, and the final images will undergo special image processing methods, including temperature calibration data and ratiometric methods, to produce a plot of a color coded temperature distribution of the HIFU focal region and other regions behind and in front of the focal region.

Although several embodiments of this invention have been described above with a certain degree of particularity, those skilled in the art could make numerous alterations to the disclosed embodiments without departing from the spirit or scope of this invention. For example, though the invention has been described in connection with a water-based immersion liquid, it should be understood that other immersion liquids may also be utilized. Further, though the optical tracking devices have been described as integrated into optical devices 36a-36h, separate optical tracking devices may be employed without departing from the spirit and scope of the present invention. In addition, though the methods of the present invention have been described in connection with pulse activating the optical transmitters, the invention can also be practiced by pulse activating the optical receptors.

All directional references (e.g., upper, lower, upward, downward, left, right, leftward, rightward, top, bottom, above, below, vertical, horizontal, clockwise, and counter-clockwise) are only used for identification purposes to aid the reader's understanding of the present invention, and do not create limitations, particularly as to the position, orientation, or use of the invention. Joinder references (e.g., attached, coupled, connected, and the like) are to be construed broadly and may include intermediate members between a connection of elements and relative movement between elements. As such, joinder references do not necessarily infer that two elements are directly connected and in fixed relation to each other.

It is intended that all matter contained in the above description or shown in the accompanying drawings shall be interpreted as illustrative only and not limiting. Changes in detail or structure may be made without departing from the spirit of the invention as defined in the appended claims.

What is claimed is:

1. A system for optically and non-invasively characterizing an acoustic beam, said system comprising:
   a container having an immersant disposed therein, said immersant comprising an immersion medium seeded with a plurality of seed particles;
   at least one optical transmitter that illuminates at least some of said plurality of seed particles;
   at least one optical receptor to track at least one optically-detectable parameter of at least some of said illuminated seed particles, thereby generating at least one immersant parameter map; and
   a processor that determines one or more characteristics of the acoustic beam from said at least one immersant parameter map and one or more known properties of said immersant.

2. The system according to claim 1, further comprising an acoustic source acoustically coupled to said immersant such that said acoustic source may sonicate at least some of said plurality of seed particles.

3. The system according to claim 2, wherein said acoustic source emits acoustic energy within a beam envelope, and wherein said immersion medium is seeded with said plurality of seed particles substantially only within said beam envelope of said acoustic source.

4. The system according to claim 1, wherein said immersion medium is water-based.

5. The system according to claim 1, wherein said immersant further comprises an additive to provide said immersant with tissue-like attenuation characteristics, and wherein said processor utilizes said tissue-like attenuation characteristics of said immersant to determine said one or more characteristics of the acoustic beam.

6. The system according to claim 5, wherein said additive is selected from the group consisting of gels, gellable materials, milk, cream, glycerin, mineral oil, and any combinations thereof.

7. The system according to claim 1, wherein said plurality of seed particles are less than about 20 microns in size.

8. The system according to claim 7, wherein said plurality of seed particles are about 10 microns in size.

9. The system according to claim 1, wherein said plurality of seed particles comprises a plurality of hollow glass spheres.

10. The system according to claim 1, wherein said plurality of seed particles are individually substantially acoustically invisible.

11. The system according to claim 1, wherein said plurality of seed particles provide said immersant with tissue-like attenuation characteristics, and wherein said processor utilizes said tissue-like attenuation characteristics of said immersant to determine said one or more characteristics of the acoustic beam.

12. The system according to claim 1, wherein said plurality of seed particles exhibit an optical behavior when illuminated that is a function of seed particle temperature, and wherein said at least one optical receptor tracks temperature of at least some of said illuminated seed particles to generate an immersant temperature map.

13. The system according to claim 12, wherein said seed particles exhibit an optical behavior when illuminated that is a monotonic function of seed particle temperature, and wherein said at least one optical receptor tracks temperature of at least some of said illuminated seed particles to generate said immersant temperature map.

14. The system according to claim 1, wherein said immersant is acoustically-streamable, wherein said at least one optical receptor tracks displacements of at least some of said illuminated seed particles to generate an immersant flow map, and wherein said processor utilizes said immersant flow map to determine said one or more characteristics of the acoustic beam.

15. The system according to claim 14, wherein said at least one optical receptor further tracks temperatures of at least some of said illuminated seed particles to generate an immersant temperature map, and wherein said processor utilizes said immersant flow map and said immersant temperature map to determine said one or more characteristics of the acoustic beam.

16. The system according to claim 1, wherein said immersant is substantially stagnant, wherein said least one optical receptor tracks temperatures of at least some of said illuminated seed particles to generate an immersant temperature map, and wherein said processor utilizes said immersant temperature map to determine said one or more characteristics of the acoustic beam.

17. The system according to claim 1, wherein said at least one optical receptor is positioned substantially orthogonally to a direction in which said immersant may flow.

18. The system according to claim 1, wherein said at least one optical receptor comprises at least one digital camera.

19. The system according to claim 1, wherein said at least one optical receptor comprises at least one optical thermographic temperature measurement device.

20. The system according to claim 1, wherein said at least one optical transmitter illuminates at least some of said plurality of seed particles in a slicewise manner.

21. The system according to claim 1, wherein said at least one optical transmitter pulse illuminates at least some of said plurality of seed particles.

22. The system according to claim 1, wherein said at least one optical transmitter comprises at least one solid state laser.

23. The system according to claim 1, wherein at least one optical device comprises both said at least one optical transmitter and said at least one optical receptor.

24. The system according to claim 1, wherein said immersant is visually transparent to a human.

25. A system for optically and non-invasively characterizing an acoustic beam in three dimensions, said system comprising:
an immersant comprising a liquid-based immersion medium mixed with a plurality of seed particles, wherein said seed particles respond to illumination with fluorescence indicative of at least one parameter of said immersant;
at least one optical transmitter to illuminate at least one slice of said immersant;
at least one optical receptor to receive fluorescence from seed particles within one or more illuminated slices; and
a processor to generate a three-dimensional map of at least one immersant parameter from fluorescence received by said at least one optical receptor.

26. The system according to claim 25, wherein said liquid-based immersion medium comprises a water-based immersion medium.

27. The system according to claim 25, further comprising a processor to analyze said three-dimensional map and determine therefrom one or more characteristics of the acoustic beam.

28. The system according to claim 25, wherein said at least one optical transmitter illuminates a plurality of substantially parallel slices.

29. The system according to claim 25, wherein said at least one optical transmitter illuminates a plurality of substantially coaxial slices.

30. The system according to claim 25, wherein said at least one optical receptor is oriented substantially orthogonally to said one or more illuminated slices.

31. The system according to claim 25, wherein said at least one slice is oriented substantially parallel to a direction in which said immersant may flow.

32. The system according to claim 25, wherein said at least one parameter of said immersant is immersant flow.

33. The system according to claim 25, wherein said at least one parameter of said immersant is immersant temperature.

34. A method of optically and non-invasively characterizing an acoustic beam, comprising the steps of:
providing an immersant comprising an immersion medium seeded with a plurality of seed particles;
sonicating at least some of the plurality of seed particles with the acoustic beam;
illuminating at least some of the sonicated seed particles;
tracking at least one optically-detectable parameter of at least some of the illuminated seed particles, thereby generating at least one immersant parameter map; and
determining one or more characteristics of the acoustic beam from the at least one immersant parameter map and one or more known properties of the immersant.

35. The method according to claim 34, wherein the step of providing an immersant comprises seeding a water-based immersion medium with a plurality of substantially acoustically-invisible seed particles, wherein the seed particles are acoustically matched to the immersion medium.

36. The method according to claim 34, further comprising adjusting the immersant to have tissue-like attenuation characteristics, and wherein the step of determining one or more characteristics of the acoustic beam utilizes the tissue-like attenuation characteristics of the immersant.

37. The method according to claim 34, wherein the step of illuminating at least some of the sonicated seed particles comprises pulse illuminating at least some of the sonicated seed particles.

38. The method according to claim 34, wherein the step of illuminating at least some of the sonicated seed particles comprises sequentially illuminating at least some of the sonicated seed particles in a slicewise manner.

39. The method according to claim 34, wherein the step of tracking at least one optically-detectable parameter of at least some of the illuminated seed particles comprises tracking displacements of at least some of the illuminated seed particles, and wherein the at least one immersant parameter map includes an immersant flow map.

40. The method according to claim 39, wherein the step of tracking at least one optically-detectable parameter of at least some of the illuminated seed particles further comprises tracking temperatures of at least some of the illuminated seed particles, and wherein the at least one immersant parameter map further includes an immersant temperature map.

41. The method according to claim 34, wherein the step of tracking at least one optically-detectable parameter of at least some of the illuminated seed particles comprises tracking temperatures of at least some of the illuminated seed particles, and wherein the at least one immersant parameter map includes an immersant temperature map.

42. The method according to claim 34, wherein the immersant is flowable, and wherein the step of sonicating at least some of the plurality of seed particles results in acoustic streaming of the immersant.

43. The method according to claim 42, wherein the step of tracking at least one optically-detectable parameter of at least some of the illuminated seed particles comprises tracking displacements of at least some of the illuminated seed particles after an equilibrium flow state is reached.

44. The method according to claim 34, wherein the immersant is substantially stagnant, and wherein the step of sonicating at least some of the plurality of seed particles results in acoustic heating of the immersant.

45. The method according to claim 44, wherein the step of tracking at least one optically-detectable parameter of at least some of the illuminated seed particles comprises tracking temperatures of at least some of the illuminated seed particles after a thermal relaxation time has elapsed.

46. The method according to claim 34, wherein the step of determining one or more characteristics of the acoustic beam from the at least one immersant parameter map and one or more known properties of the immersant comprises:
  assuming values for the one or more characteristics;
  modeling behavior in the immersant of an acoustic beam having the assumed values, thereby generating at least one modeled parameter map;
  comparing the at least one modeled parameter map to the at least one immersant parameter map; and
  utilizing an optimization algorithm to refine the assumed values for the one or more characteristics.

47. The method according to claim 46, further comprising iteratively repeating the steps below until a difference between the at least one modeled parameter map and the at least one immersant parameter map is minimized:
  modeling behavior in the immersant of an acoustic beam having the assumed values, thereby generating at least one modeled parameter map;
  comparing the at least one modeled parameter map to the at least one immersant parameter map; and
  utilizing an optimization algorithm to refine the assumed values for the one or more characteristics.

48. The method according to claim 46, wherein the step of modeling behavior in the immersant of an acoustic beam having the assumed values, thereby generating at least one modeled parameter map comprises utilizing the Khokhlov-Zabolotskaya-Kuznetsov non-linear parabolic wave equation, the assumed values, and the one or more known properties of the immersant to model behavior in the immersant of an acoustic beam having the assumed values.

49. The method according to claim 46, wherein the optimization algorithm is Newton's method.

50. A method of modeling behavior of a high intensity focused ultrasound medical device, comprising the steps of:
  acoustically coupling the medical device to an immersant including an immersion medium seeded with a plurality of seed particles, the immersant having tissue-like acoustic and thermal characteristics;
  activating the medical device to emit high intensity ultrasonic energy into the immersant within a beam envelope;
  illuminating at least some of the plurality of seed particles within the beam envelope;
  optically measuring at least one parameter of at least some of the illuminated seed particles; and
  generating a map of at least one immersant parameter from the at least one optically measured parameter.

51. The method according to claim 50, wherein the at least one optically measured parameter is displacement of at least some of the illuminated seed particles, and wherein the map includes immersant flow information.

52. The method according to claim 50, wherein the at least one optically measured parameter is temperature of at least some of the illuminated seed particles, and wherein the map includes immersant temperature information.

* * * * *